United States Patent
Shimbo

(10) Patent No.: US 6,175,464 B1
(45) Date of Patent: *Jan. 16, 2001

(54) AUTOREVERSE MECHANISM

(75) Inventor: Takaichi Shimbo, Tokyo (JP)

(73) Assignee: MEC Co., Ltd., Tokyo (JP)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/943,809

(22) Filed: Oct. 3, 1997

(51) Int. Cl.[7] .................................................. G11B 15/48
(52) U.S. Cl. .......................................... 360/74.1; 360/74.2
(58) Field of Search .......................... 369/258; 360/74.1, 360/137, 105, 78.02, 96.3, 71, 74.2

(56) References Cited

U.S. PATENT DOCUMENTS

| | | | |
|---|---|---|---|
| 4,463,396 | * 7/1984 | Osani | 360/105 |
| 4,581,665 | * 4/1986 | Ito et al. | 360/96.3 |
| 4,799,116 | * 1/1989 | Ida et al. | 360/74.1 |
| 4,935,831 | 6/1990 | Shimbo . | |
| 5,063,455 | * 11/1991 | Yoshimura | 360/96.5 |
| 5,363,259 | * 11/1994 | Narita | 360/96.3 |
| 5,798,900 | 8/1998 | Shimbo . | |

* cited by examiner

Primary Examiner—Stuart S. Levy
Assistant Examiner—Tod Kupstas
(74) Attorney, Agent, or Firm—Greenblum & Bernstein, P.L.C.

(57) ABSTRACT

An auto reverse mechanism in a tape recorder system having a single magnetic head for forward playback (recording) and a single magnetic head for reverse playback (recording), both mounted on a head base, comprises a select lever for selecting between forward and reverse modes, a main body plate for gear attachment, provided with a retaining groove for allowing the select lever to be manipulated in the direction of the selected mode, and a forked guide hole so formed as to permit the head base to move forward from the position of the select lever in the selected forward or reverse mode.

6 Claims, 13 Drawing Sheets

AUTOREVERSE MECHANISM

BACKGROUND OF THE INVENTION

1. Field of the Invention

The present invention relates to an autoreverse mechanism mainly in a cassette tape recorder, which is designed to ensure both the forward mode and reverse mode by a simple manipulation and a simple structure of adding minimum parts to a conventional unidirectional playback mechanism in a forward-reverse switching mechanism.

2. Description of the Related Art

A typical autoreverse mechanism of the conventional type has a slidable head base on which a second head base carrying forward and reverse heads is provided, and stitches between the forward head and reverse head.

The conventional autoreverse mechanism inevitably has a large size, making its compact design difficult, and has such a complex structure as to be prone to cause malfunction and make tape running adjustment difficult.

SUMMARY OF THE INVENTION

Accordingly, it is an objective of the present invention to provide and autoreverse mechanism which is designed to overcome the conventional shortcoming.

To achieve this object, according to one aspect of this invention, there is provided an autoreverse mechanism in a tape recorder system having a single magnetic head for forward playback (recording) and a single magnetic head for reverse playback (recording), both mounted on a head base, which mechanism comprises a select-lever retaining groove formed on a flat surface of a main body plate; a select lever, retained in the select-lever retaining groove, for selecting between forward and reverse modes; and a forked guide hole so formed as to permit the head base to move forward in inclination from a position of the select lever in the selected forward or reverse mode.

The above-described structure can accomplish forward and reverse modes by simply adding one part to the conventional autoreverse mechanism, thus ensuring a compact and lighter design, stable tape running operation and cost reduction, so that this mechanism is particularly suitable for use in a microcassette tape recorder.

DETAILED DESCRIPTION OF THE PREFERRED EMBODIMENT

Figure 1:
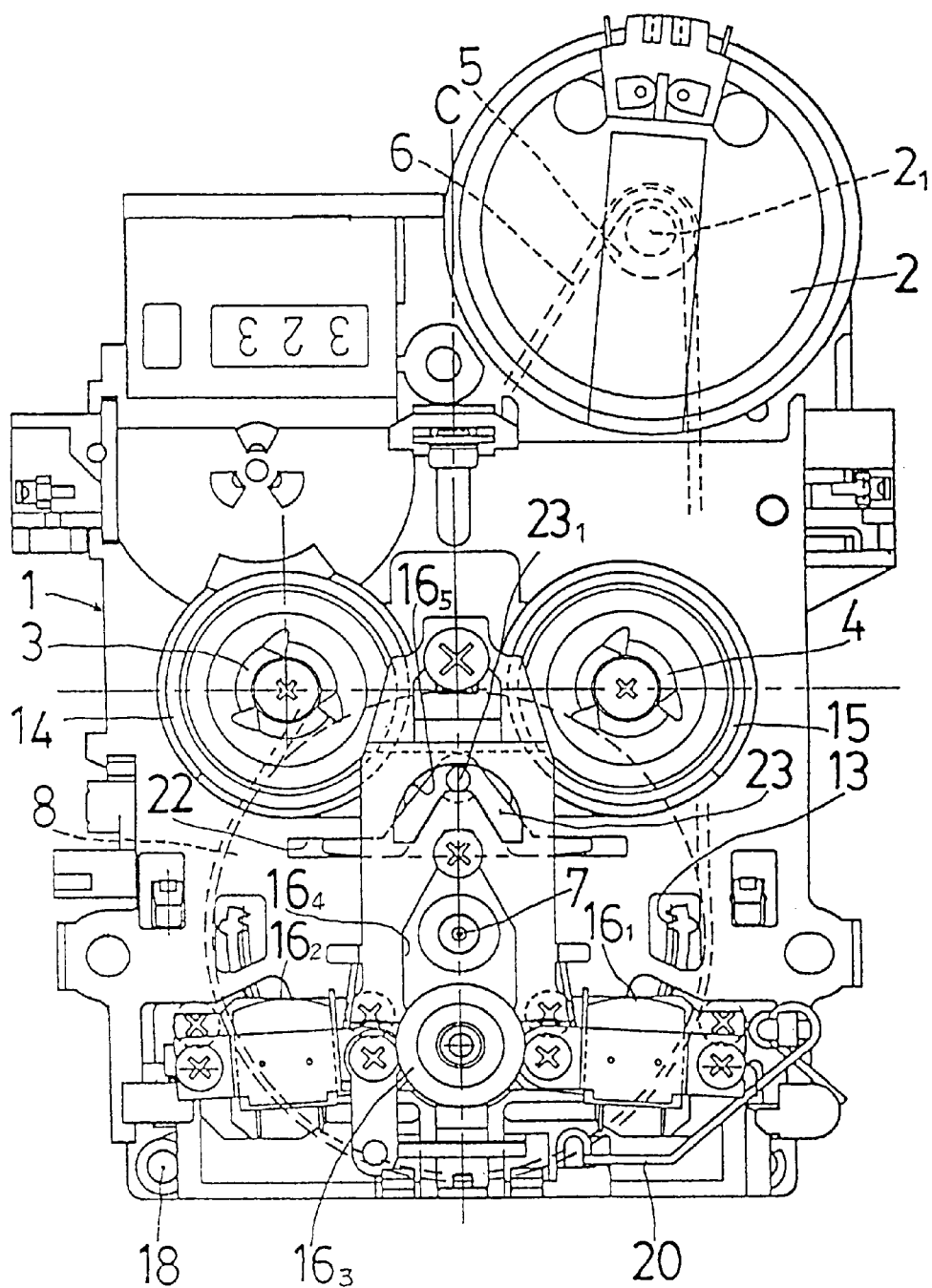
FIG. 1 is an enlarged plan view of a cassette tape recorder equipped with a an autoreverse mechanism according to this invention.
Figure 2:
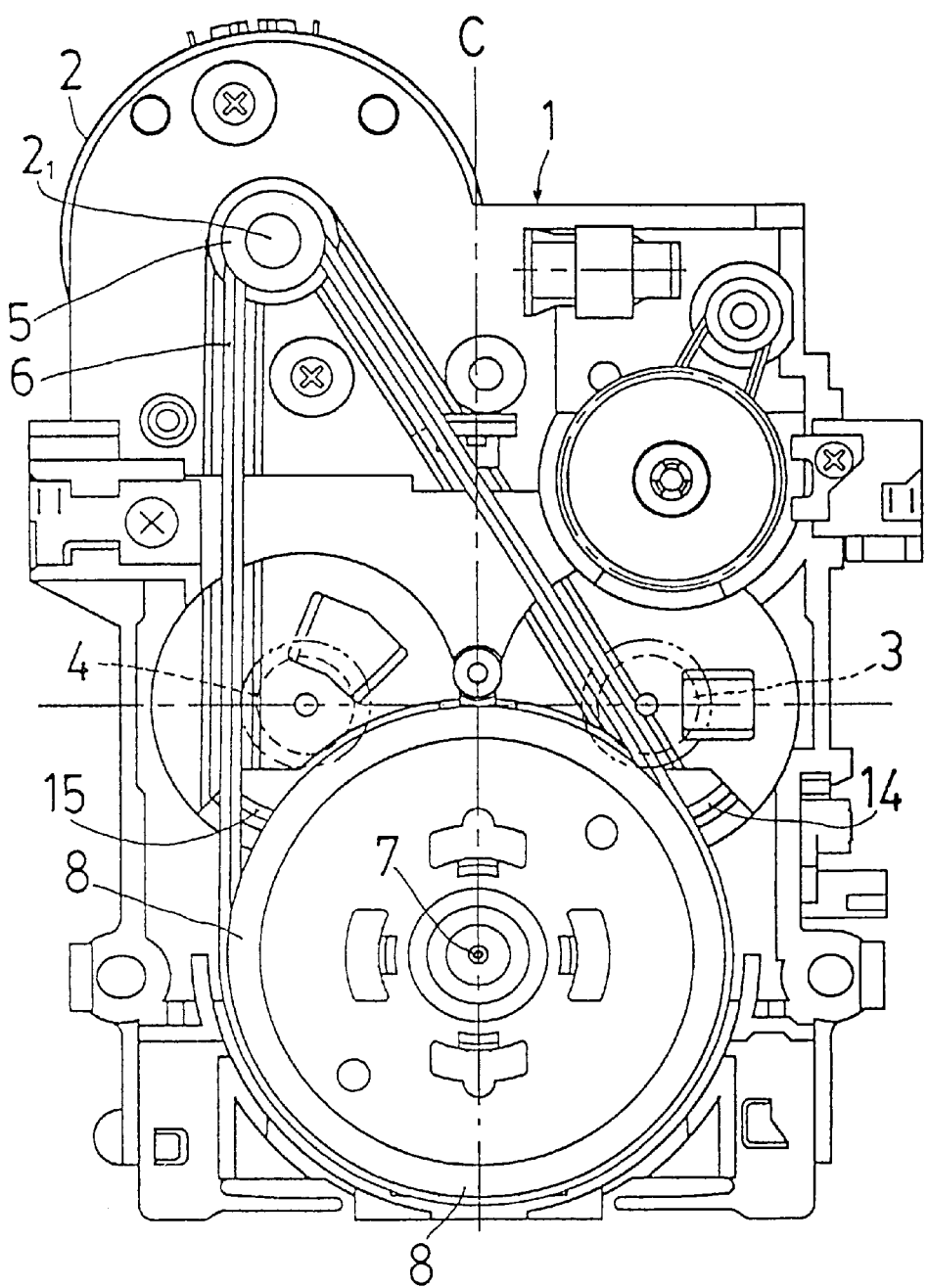
FIG. 2 is a bottom view of the cassette tape recorder in FIG. 1.

An autoreverse mechanism according to one embodiment of the present invention as adapted for use in a microcassette tape recorder will now be described with reference to the accompanying drawings.

In the figures, a motor 2, provided on the top side of a main body plate 1, is capable of rotating forward and reversely at a variable speed. Reference numeral "3" is a play reel and reference numeral "4" is a rewind reel. A small-diameter pulley 5 is attached to an output shaft $2_1$ of the motor 2 on the bottom side of the main body plate 1. A belt 6 serves to transmit the power of the motor 2 to a flywheel pulley 8 which is provided coaxial to a capstan 7.

A fixed gear 9 is provided coaxial and integral with the flywheel pulley 8. A gear plate 10 is provided coaxial to the capstan 7 and the flywheel pulley 8 and is rotatable together with them. A notch $10_1$ is formed at the top portion of the gear plate 10.

An idle gear 11 engages with the fixed gear 9 on the flywheel pulley 8 via the gear plate 10. A projection 12, provided on the gear plate 10, is formed as an extension of the shaft of the idle gear 11 in the illustrated example.

An internal gear 13 has an circular engagement surface which engages with the idle gear 11 that is rotated by the gear plate 10, and which is approximately semicircular, concentric to the gear plate 10 in the illustrated example.

A play reel gear 14 coaxial to the play reel 3. A rewind gear 15 is concentric to the rewind reel 4. Reference numeral "16" is a head base which is placed on the top of the main body plate 1 and on which a forward-side magnetic head $16_1$, a reverse-side magnetic head $16_2$, a pinch roller $16_3$, etc. are mounted. The head base 16 is moved forward by gears while tilting the magnetic head $16_1$ ($16_2$) upper rightward or upper leftward at a predetermined angle θ (about 4 degrees in the illustrated example) to the center of the capstan 7 as the perpendicular line. A hole $16_4$ is formed in the head base 16 to receive the capstan 7. A forked groove $16_5$ of an approximately trapezoidal shape is formed in the head base 16 in such a way that as a select arm 23 moves horizontally in either the forward mode or reverse mode selected, it is set in a rightward inclined groove $16_5'$ when the head base 16 which has moved forward in inclination is in the forward mode and it is set in a leftward inclined groove $16_5''$ when the head vase 16 which has moved forward in inclination is in the reverse mode. In this case, the head base 16 which has moved forward toward the capstan 7 is inclined upper rightward or upper leftward at the predetermined angle θ due to restriction by the projection, $23_1$, of the select lever 23 regardless of whether it is the forward mode or the reverse mode.

A pair of play levers 17 and 17', provided on the top surface of the main body plate 1, have their proximal end portions coupled to attachment rods 18, and positioning projections $17_1$ and $17_1'$ at the time their distal ends $17_2$ and $17_2'$ are turned, so that the pinch roller $16_3$ on the head base 16 is moved toward or away from the capstan 7.

An arm-like lock mechanism 19 serves to move the head vase 16 to the position of the play lever 17 (or 17') with respect to the tape face, $T_1$, of a cassette tape t and hold the stop state. The lock mechanism 19 has a first engagement portion $19_1$ and a second engagement portion $19_2$ on each side, which face the projection $17_1$ (or $17_1$') of the associated play lever 17 (or 17') and are to engage with each other. The first engagement portions $19_1$ and second engagement portions $19_2$ are formed integral with the head base 16. As the play lever 17 (17') turns, therefore, the lock mechanism 19 performs a locking operation or an unlocking operation. With the head base 16 at the original position, the projection $17_1$ (17) of the play lever 17 (17') engages with the associated second engagement portion $19_2$ of the lock mechanism 19.

A return spring 20 exerts reactive force to move the head base 16 away from the capstan 7.

a horizontal select-lever retaining groove 22 is provided on the main body plate 1. The select lever 23 is received in this retaining groove 22 in such a manner as to be horizontally movable therein. Provided at the upper center of the select lever 23 is the projection $23_1$ which engages with the forked grove $16_5$.

SPECIFIC EXAMPLES OF ACTIONS (1) Stop State

Figure 3:
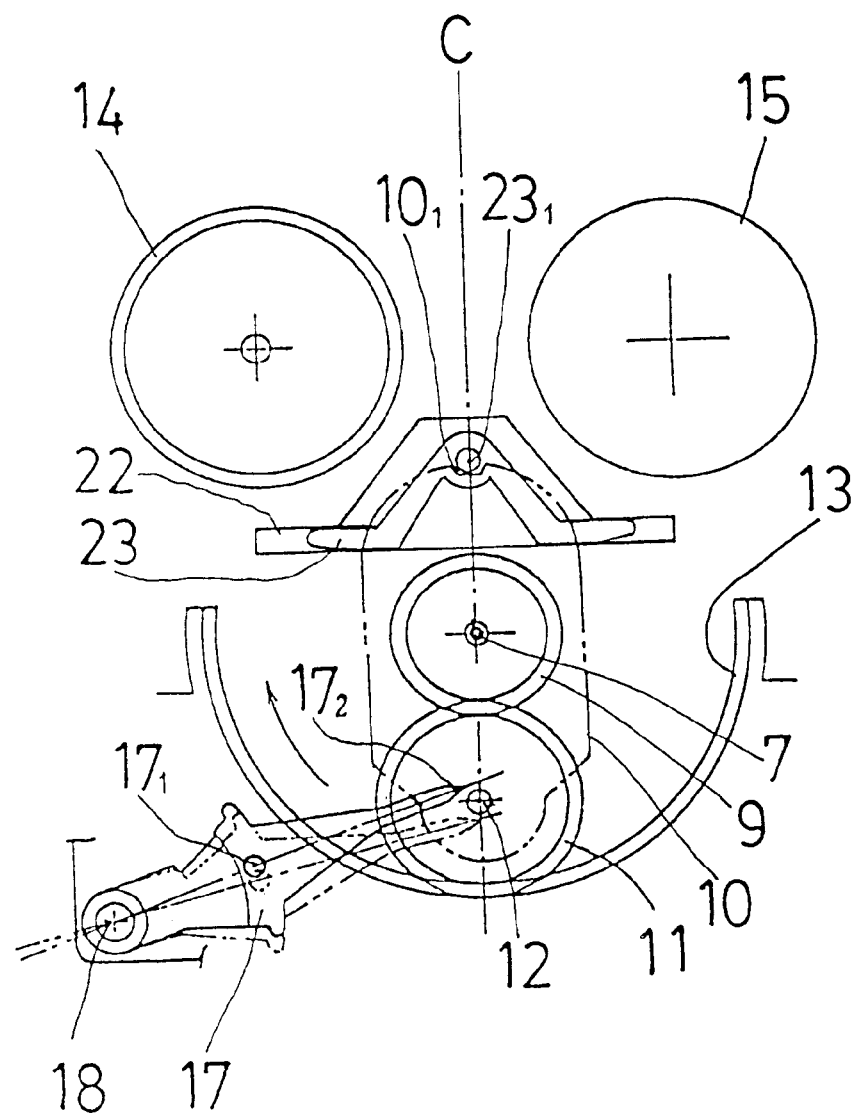
FIG. 3 is a plan view showing a select lever, gears and a play lever in a stop mode.
Figure 4:
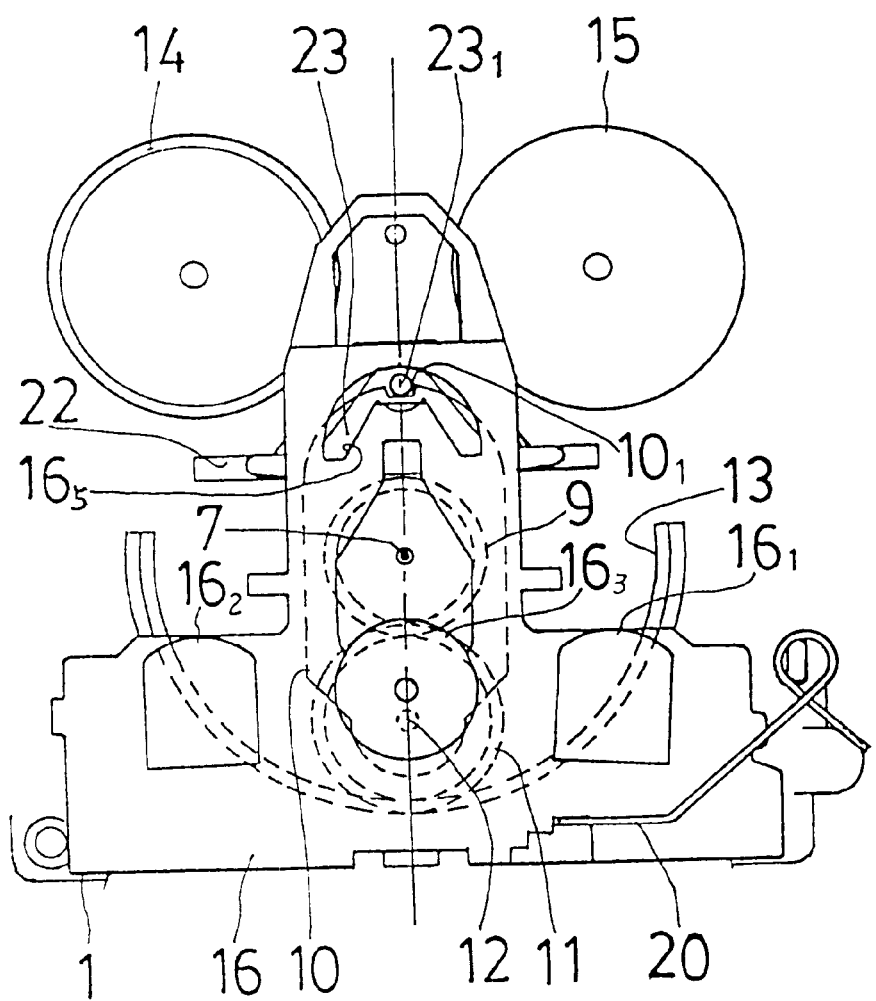
FIG. 4 is a plan view of a head base in the stop mode.
Figure 5:
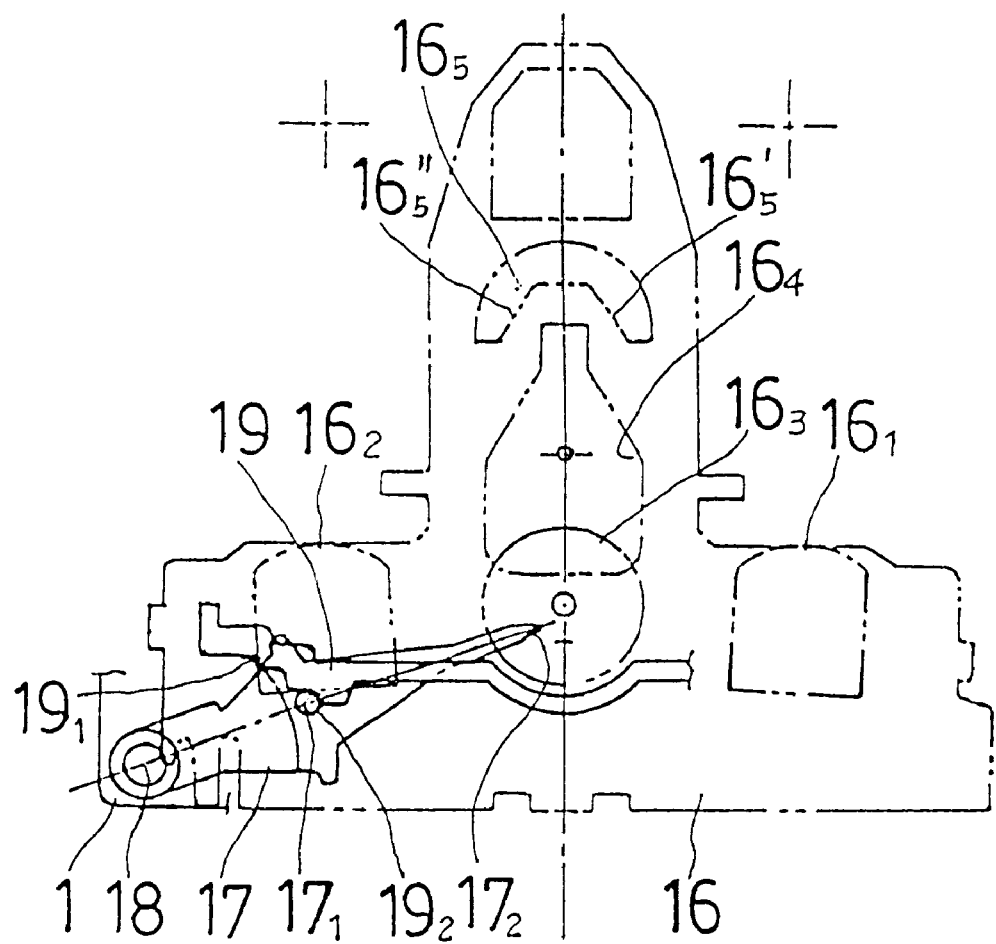
FIG. 5 is a plan view illustrating the relationship among the head base, the play lever and a lock mechanism in the stop mode.

With the head base 16 in the stop state shown in FIGS. 3 to 5, the head base 16 is set downward, the left and right play levers 17 and 17' are free, and the gear plate 10 and the idle gear 11 are at the middle of the right and left moving positions with a line C at the center.

With the motor 2 stopped, the idle gear 11 is positioned almost directly on the center line C, the play lever 17 is positioned between the play reel gear 14 and the idle gear 11, and the head base 16 is at the original position where the magnetic heads $16_1$ and $16_2$ are moved away from the tape face $T_1$.

At this time, the select lever 23 is positioned downward at the center with its projection $23_1$ engaging with the notch $10_1$ at the top of the gear plate 10.

The pinch roller $16_3$ is set away from the capstan 7, and the projection $17_1$ of the play lever 17 is in engagement with the associated second engagement portion $19_2$ of the lock mechanism 19 (FIG. 5) integral with the head base 16.

(2) Forward Action from Stop State

When the head base 16 in FIGS. 3–5 is turned clockwise around the capstan 7 from the stop state, the gear plate 10 turns clockwise too, with the projection 12 of the idle gear 11 pushing the play lever 17 upward (in the direction of the solid arrow in FIG. 3). As the turning continues, the projection 12 comes free of the distal end $17_2$ of the play lever 17, so that the idle gear 11 engages with the play reel gear 14. When the select lever 23 whose projection $23_1$ has been in engagement with the notch $10_1$ at the top of the gear plate 10 from the beginning of the turning action to a part of the way, is moved rightward horizontally by a predetermined distance g, the engagement is broken at which time the projection $23_1$ is set in the rightward inclined groove $16_5$'of the forked groove $16_5$ in the head bases 16. As a result, the head base 16 moves forward while being inclined upper rightward by a predetermined angle θ (about 4 degrees in the illustrated example), so that the pinch roller $16_3$ comes closer to the capstan 7 and the forward-side magnetic head $16_1$ contacts the tape face $T_1$ of the cassette tape. When the projection 12 pushes the play lever 17 and comes free of the distal end $17_2$, the projection $17_1$ of the play lever 17 engages with the associated first engagement portion $19_1$ (FIG. 8).

Figure 6:
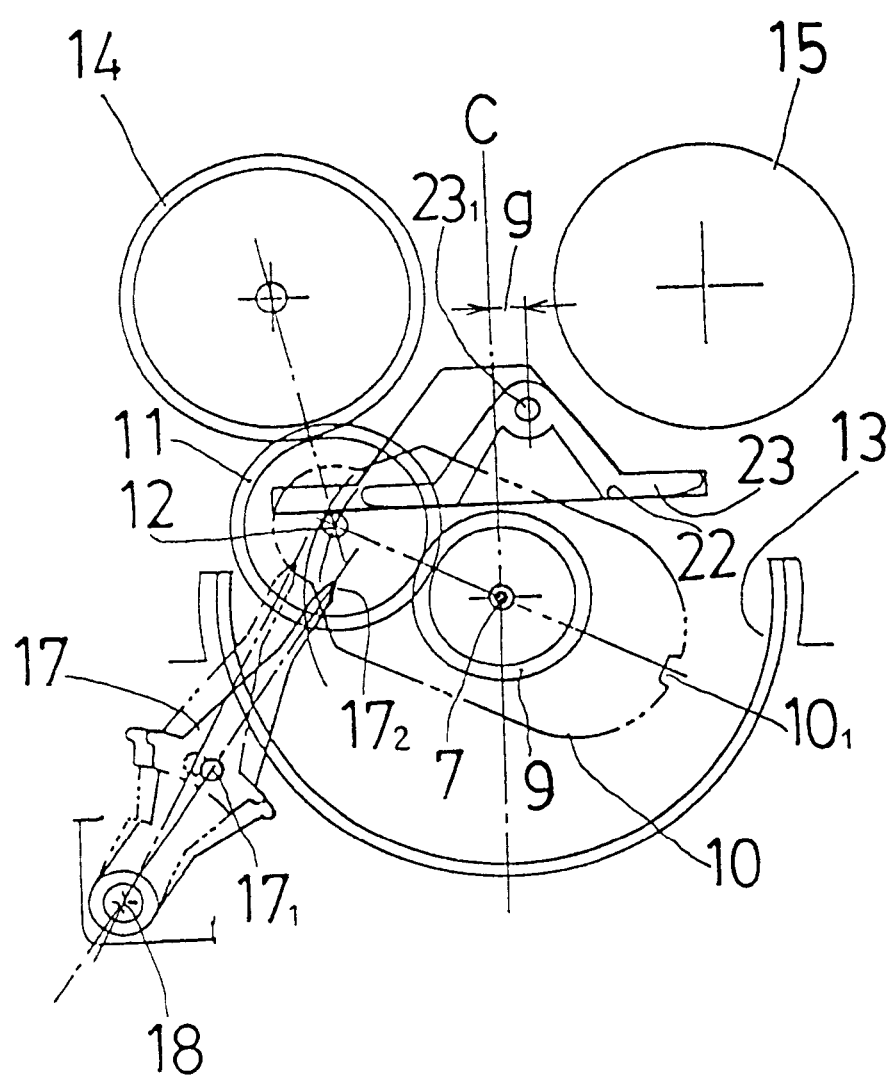
FIG. 6 is a plan view showing the select lever, the play lever and the gears in a forward mode.
Figure 7:
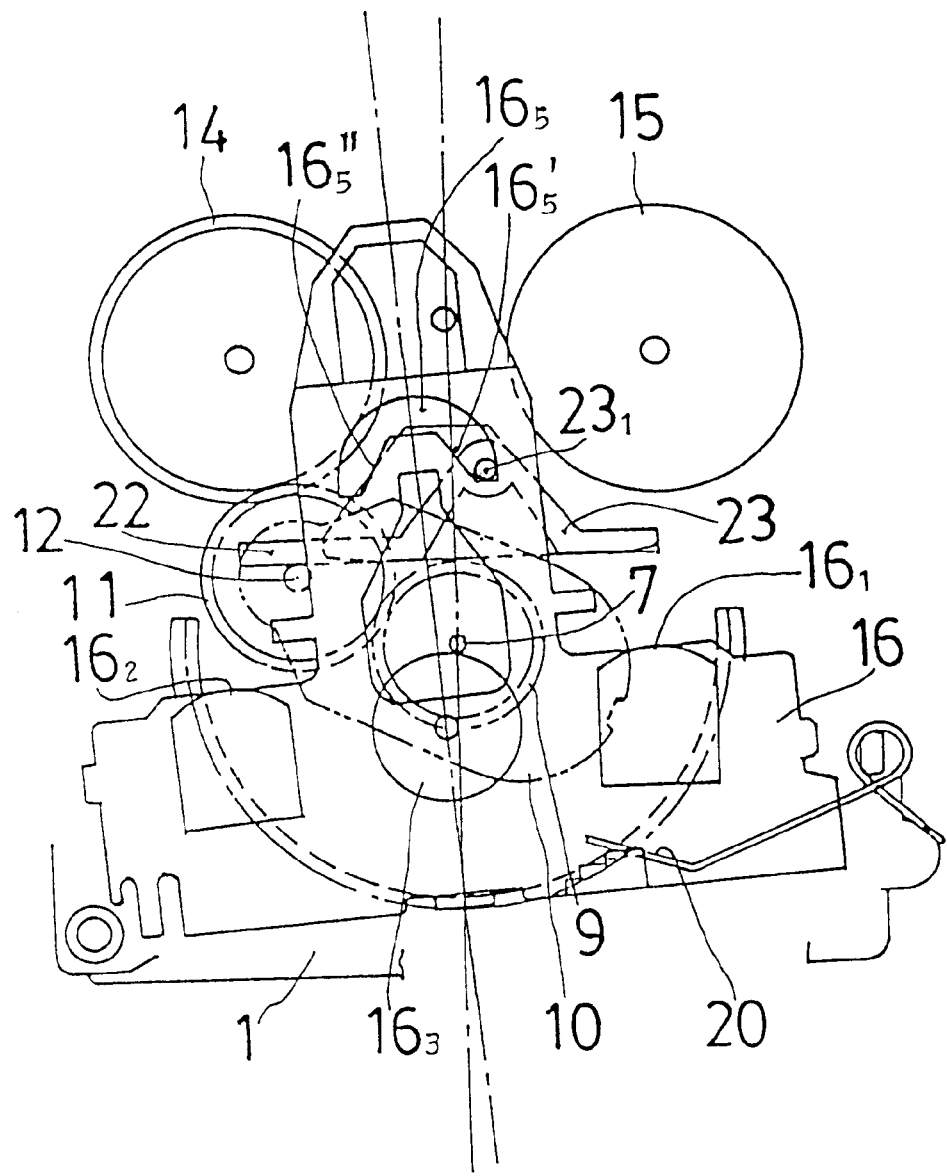
FIG. 7 is a plan view depicting the head base, the gears and the select lever in the forward mode.
Figure 8:
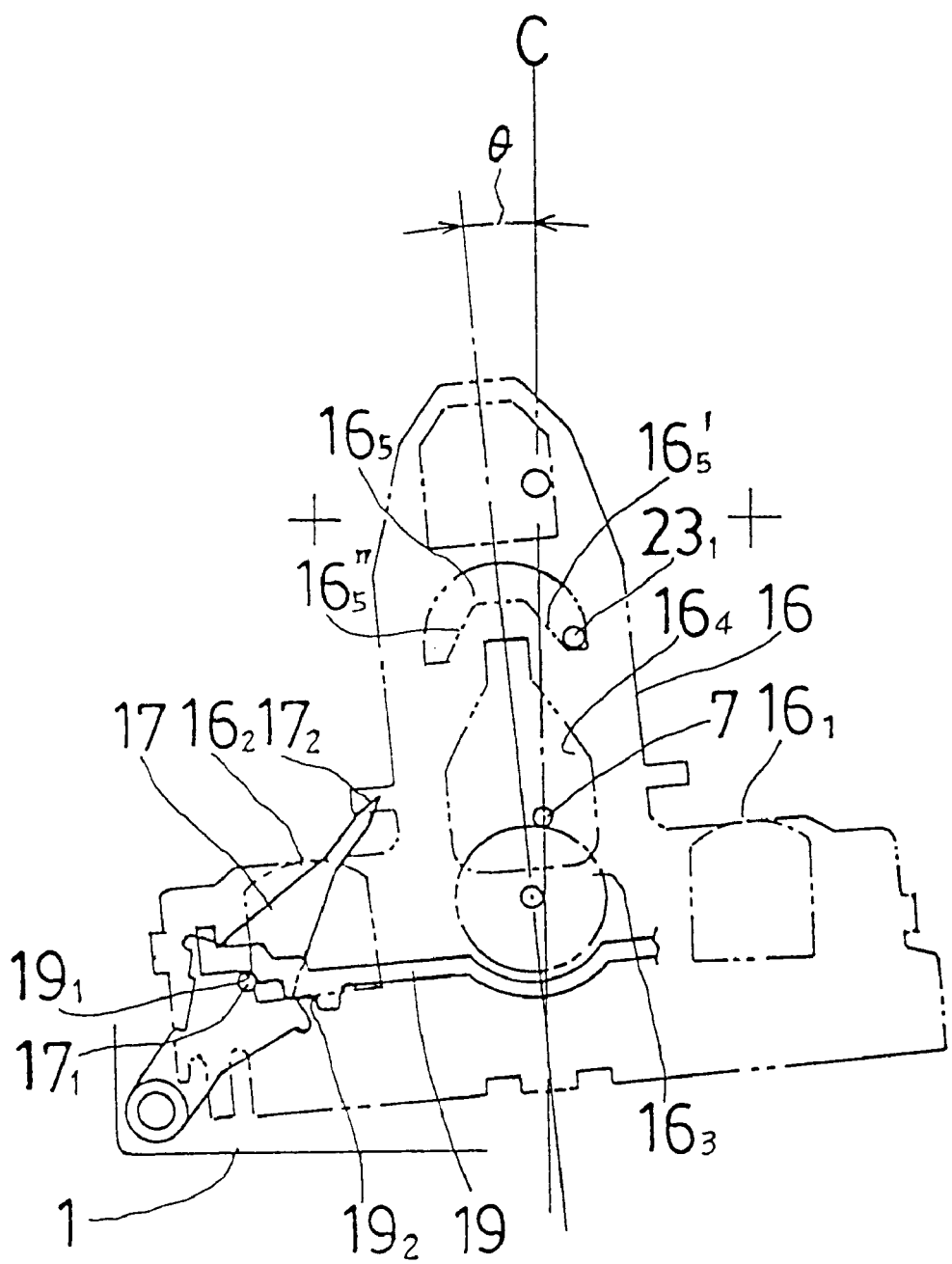
FIG. 8 is a plan view illustrating the head base, the play lever and the lock mechanism in the forward mode.

Through the above-described action, as illustrated in FIGS. 6 to 8, the capstan 7 is pressed against the punch roller $16_3$, the head base 16 is moved forward while being inclined upper rightward by a predetermined angle and is locked by the lock mechanism 19, the rewind reel 4 rotates clockwise as the torque is transmitted from the capstan 7 to the idle gear 11 and then to the rewind reel 4. Then, of the right and left magnetic heads $16_1$ and $16_2$, only the right magnetic head $16_1$ is pressed against the tape face $T_1$.

(3) Stop Action for Forward-to-Reverse Transition

As the gear plate 10 is turned counterclockwise, the projection 12 of the idle gear 11 pushes the play lever 17 downward to release the lock mechanism 19 of the head base 16. As a result, the head base 16 comes to the state where the right magnetic head $16_1$ is retracted from the upper rightward position so that both magnetic heads $16_1$ and $16_2$ come to the same height. The pinch roller $16_3$ is moved away from the capstan 7 at which time the tape face $T_1$ is set free of the magnetic head $16_1$ and becomes the stop state (FIGS. 3–5).

(4) Reverse Action from Stop State

The transition to the reverse action from the stop state is symmetrical or mirror-imaging to the transition to the forward action (FIGS. 6–8).

When the gear plate 10 is turned rightward or counterclockwise around the center line C from the stop state (FIGS. 3–5), the projection 12 of the idle gear 11 pushes the right play lever 17' upward and comes free of the distal end $17_2$' of the play lever 17', so that the idle gear 11 engages with the right gear (rewind reel gear) 1'5. When the select lever 23 whose projection $23_1$ has been in engagement with the notch $10_1$ at the top of the gear plate 10 from the beginning of the turning action to a part of the way, is moved leftward horizontally by a predetermined distance g', the engagement is broken at which time the projection $23_1$ is set in the leftward inclined groove $16_5$" of the forked groove $16_5$. As a result, the head base 16 moves forward while being inclined upper leftward by a predetermined angle θ (about 3.75 degrees in the illustrated example), so that the pinch roller $16_3$ comes closer to the capstan 7 and the reverse-side magnetic head $16_2$ contacts the tape face $T_1$ of the cassette tape. When the projection 12 pushes the play lever 17' and comes free of the distal end $17_2$', the right first engagement portion $19_1$ of the lock mechanism 19 engages with the projection $17_1$' of the play lever 17'.

Figure 9:
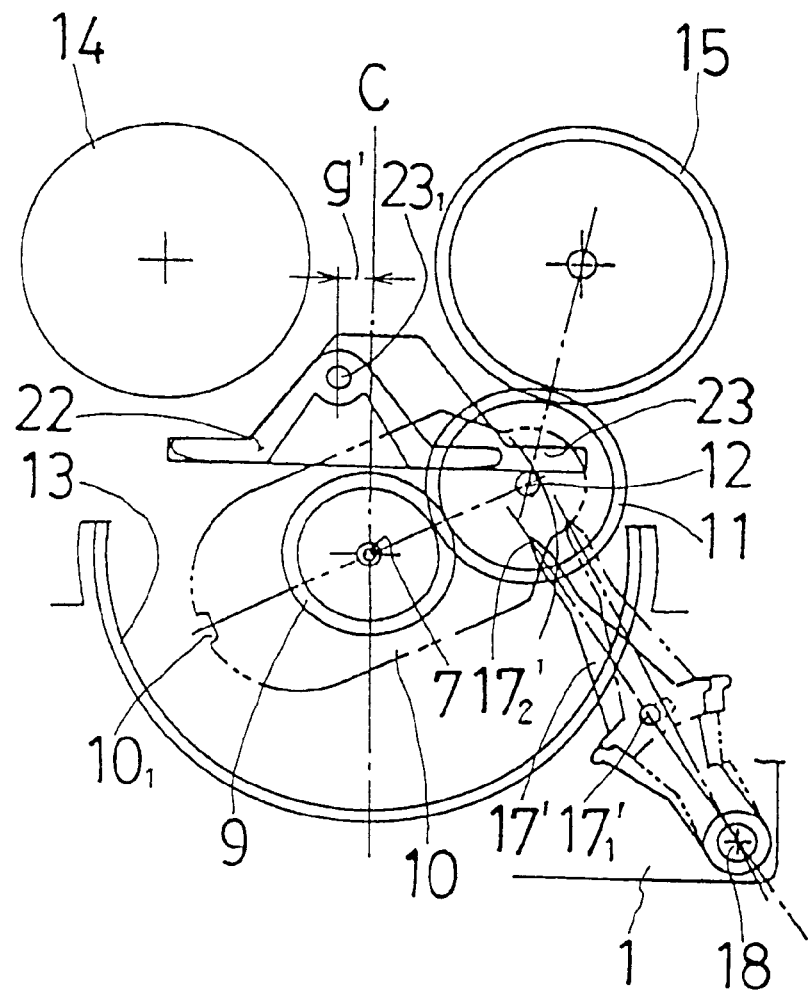
FIG. 9 is a plan view showing the select lever, the play lever and the gears in a reverse mode.

At this time, the capstan 7 rotates symmetrically. When the head base 16 moves forward in upper leftward inclination, the magnetic head $16_2$ is set to the upper leftward position to contact the tape face $T_1$, thereby establishing the reverse mode (FIGS. 9–11).

(5) Action for Fast Forward Mode

Figure 10:
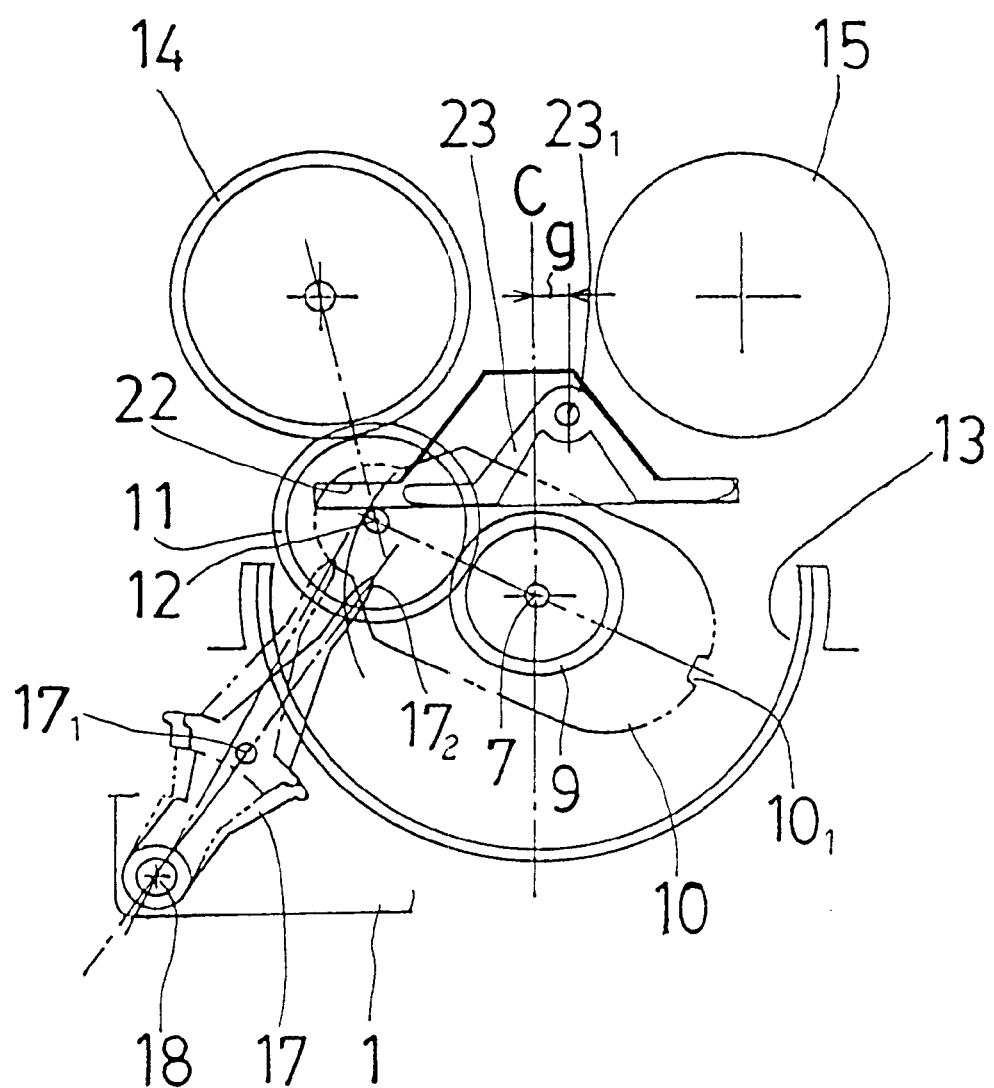
FIG. 10 is a plan view depicting the head base, the gears and the select lever in the reverse mode.
Figure 11:
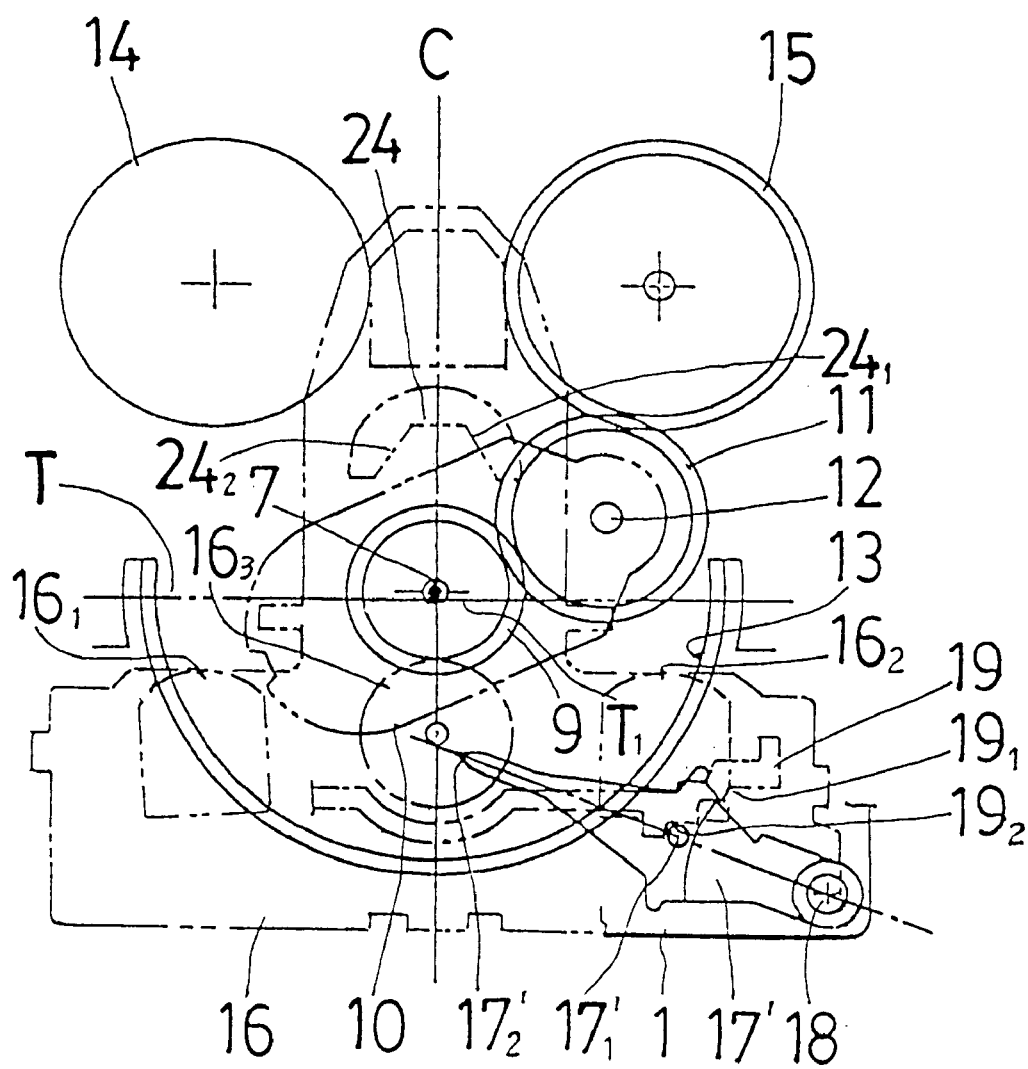
FIG. 11 is a plan view illustrating the head base, the play lever and the lock mechanism in the reverse mode.

In the reverse mode in FIG. 10, the gear plate 10 is turned clockwise around the capstan 7 to push the play lever 17 downward with the projection 12 of the idle gear 11. As the projection 12 comes free of the distal end $17_2$ of the play lever 17, the idle gear 11 returns to the center position. After the select lever 23 whose projection $23_1$ has been in engagement with the notch $10_1$ at the top of the gear plate 10 from the beginning of the turning action to a part of the way, is moved leftward in the retaining groove 22, the engagement is broken.

The head base 16 set free of the play lever 17 is retracted to return to the original position by the return spring 20. At this time, the depressed play lever 17 stops as its projection $17_1$ engages with the associated second engage portion $19_2$ of the lock mechanism 19.

Figure 12:
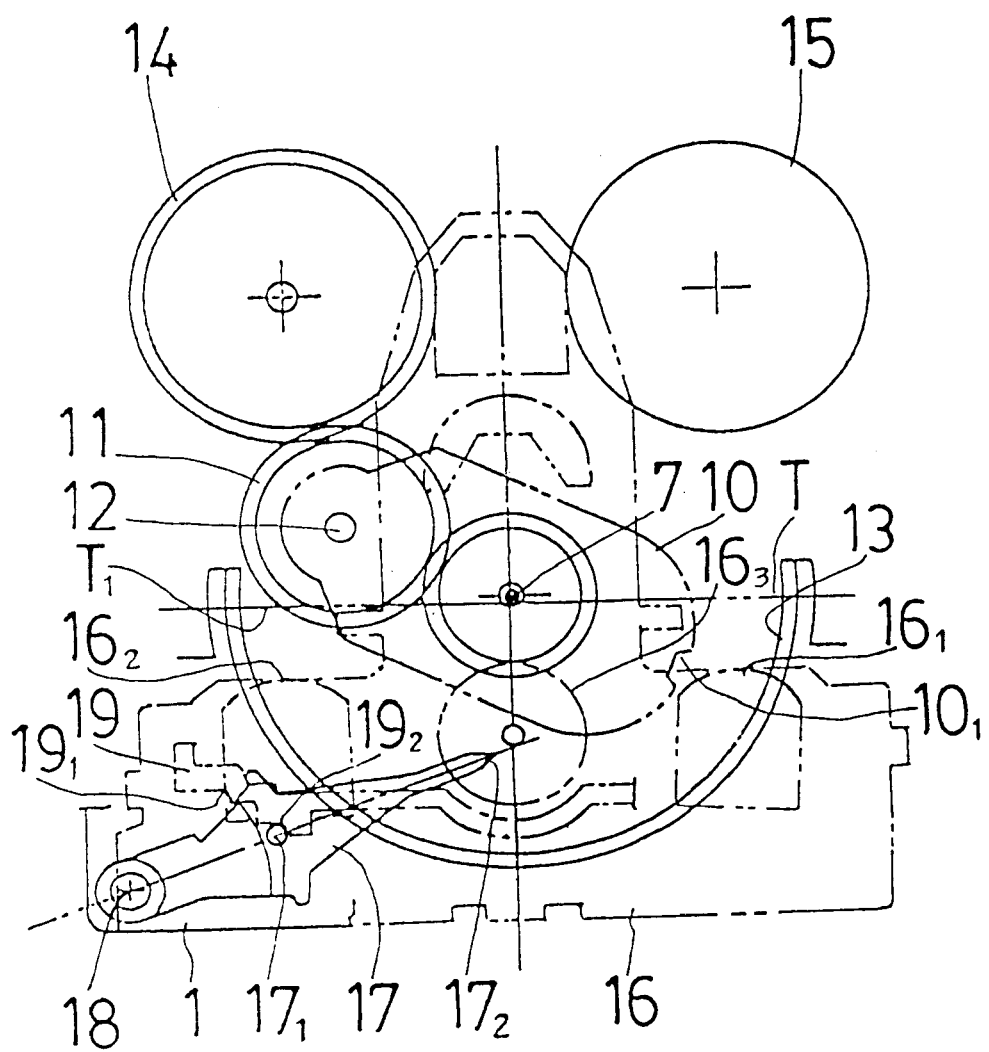
FIG. 12 is a plan view showing the select lever, the play lever and the gears in a fast forward mode.

When a motor voltage is increased in this situation by the fast forward manipulation, the rotation of the motor 2 becomes faster. When the gear plate 10 is turned clockwise again, the idle gear 11 engages with the play reel gear 14. Since the head base 16 does not move forward at this time, the pinch roller 16$_3$ is set apart from the capstan 7 (FIG. 12).

(6) Action for Rewind Mode

In the state in FIG. 10, the gear plate 10 is turned clockwise around the capstan 7 to push the play lever 17' downward with the projection 12 of the idle gear 11. As the projection 12 comes free of the distal end 17$_2$' of the play lever 17', the idle gear 11 returns to the center position. After the select lever 23 whose projection 23$_1$ has been in engagement with the notch 10$_1$ at the top of the gear plate 10 from the beginning of the turning action to a part of the way, is moved leftward in the retaining groove 22, the engagement is broken.

Figure 13:
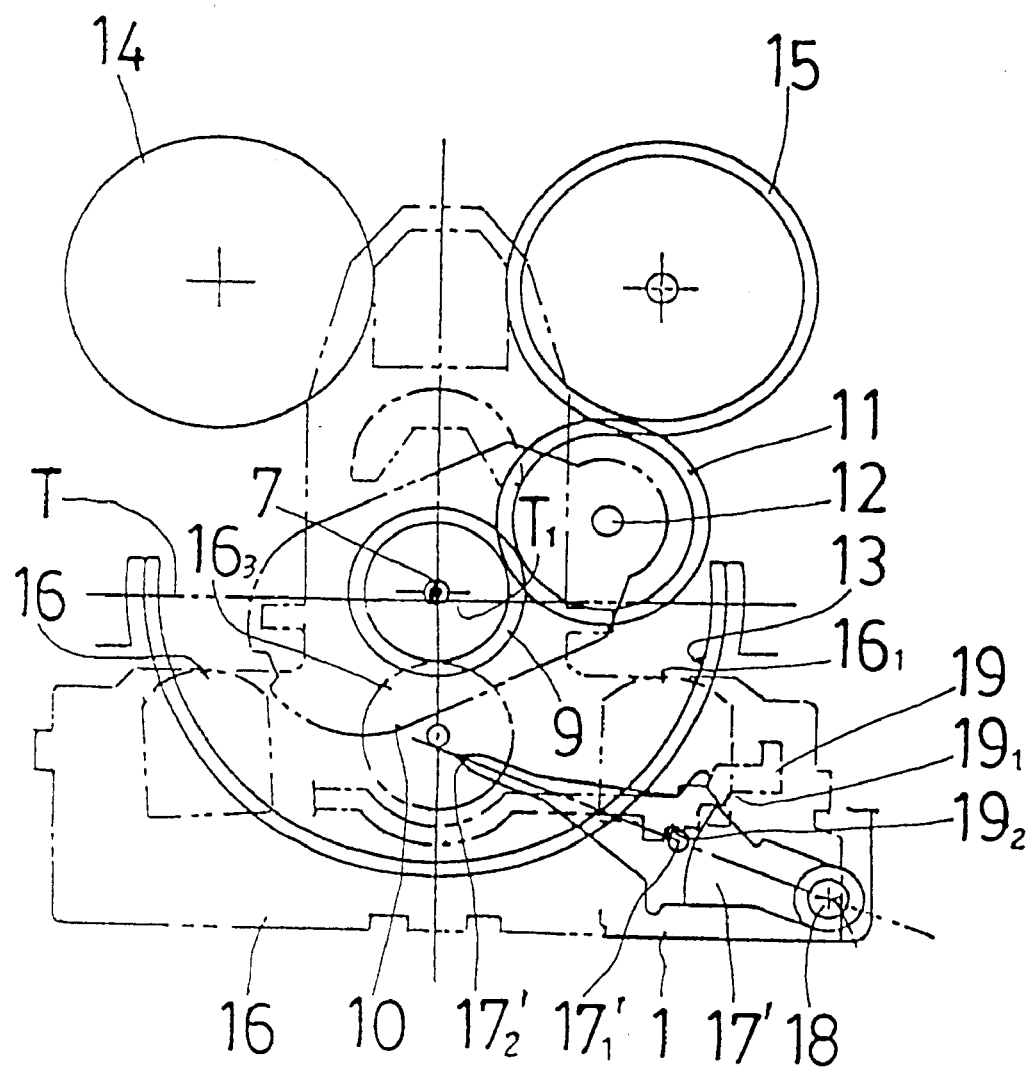
FIG. 13 is a plan view showing the select lever, the play lever and the gears in a rewind mode.

The head base 16 set free of the play lever 17' is set back to the original position by the return spring 20. At this time, the depressed play lever 17' stops as its projection 17$_1$' engages with the associated second engage portion 19$_2$' of the lock mechanism 19.

when the motor voltage is increased under this situation by the rewinding manipulation, the rotation of the motor 2 becomes faster. When the gear plate 10 is turned counter-clockwise again, the idle gear 11 engages with the rewind reel gear 15. Since the head base 16 does not move forward at this time, the pinch roller 16$_3$ is set apart from the capstan 7 (FIG. 13).

Because of the above-described structure, forward and reverse modes can be accomplished by simply adding one part to the conventional autoreverse mechanism, thus ensuring a compact and lighter design, stable tape running operation and cost reduction, so that this mechanism is particularly suitable for use in a microcassette tape recorder.

What is claimed is:

1. An auto-reverse mechanism in a cassette tape recorder comprising:

a main body plate having a groove for slidably receiving a select lever with a projection;

a motor rotatable in opposite directions, the motor being mounted on the main body plate;

a flywheel driven by the motor in opposite directions to rotate a capstan in opposite directions, the flywheel being concentric to the capstan;

a head base supporting a pinch roller and a pair of magnetic heads at opposite sides of the pinch roller, the head base having a hole that accommodates the capstan and a forked guide hole that receives the projection of the select lever, the forked guide hole having a pair of inclined guide grooves with one end of the inclined guide grooves connected to each other;

a head selector including a rotary plate rotatable with the flywheel, the rotary plate being engaged with the select lever in a tape stopped state, wherein, when the flywheel rotates, the rotary plate rotates to move the select lever within the groove of the main body plate in the same direction as rotation of the rotary plate and releases the select lever after movement for a predetermined distance, so as to move the projection into a selected one of the inclined guide grooves of the forked guide hole; and a head base lift that lifts the head base in a direction determined by the selected one of the inclined guide grooves, thereby moving the pinch roller toward the capstan and moving a selected one of the magnetic heads, which corresponds to the selected one of the inclined guide grooves, toward a tape surface.

2. An auto-reverse mechanism according to claim 1, wherein the rotary plate rotates coaxially with the capstan.

3. The auto-reverse mechanism according to claim 1, wherein the rotary plate rotates concentrically with the flywheel and the capstan.

4. The auto-reverse mechanism according to claim 1, further comprising:

a play lever having a second projection; and a lock mechanism integral with the head base, the lock mechanism having a first engagement portion and a second engagement portion;

wherein the second projection engages with the second engagement portion, so that both of the pair of magnetic heads keep away from the tape surface in the tape stopped state.

5. The auto-reverse mechanism according to claim 4, further comprising:

an idle gear provided on the rotary plate, the idle gear being rotatable around a third projection and engaged with the capstan; and the play lever having a distal end engaged with the third projection in the tape stopped state;

wherein, when the rotary plate rotates, the third projection moves to a direction opposite to a direction of movement of the projection of the select lever;

the distal end of the play lever releases the third projection; and the second projection engages with the first engagement portion of the lock mechanism, so as to keep the moved selected one of the magnetic heads in contact with the tape surface.

6. The auto-reverse mechanism according to claim 5, further comprising:

a reel that rotates a tape in a desired direction;

wherein, after the distal end of the play lever releases the third projection, the reel engages with the idle gear so that the reel is rotated by a torque transmitted from the capstan via the idle gear.

* * * * *